(12) United States Patent  (10) Patent No.: US 6,995,744 B1
Moore et al.  (45) Date of Patent: Feb. 7, 2006

(54) DEVICE AND ASSEMBLY FOR PROVIDING LINEAR TACTILE SENSATIONS

(75) Inventors: David F. Moore, San Carlos, CA (US); Erik J. Shahoian, San Ramon, CA (US)

(73) Assignee: Immersion Corporation, San Jose, CA (US)

(*) Notice: Subject to any disclaimer, the term of this patent is extended or adjusted under 35 U.S.C. 154(b) by 543 days.

(21) Appl. No.: 09/965,097

(22) Filed: Sep. 28, 2001

Related U.S. Application Data

(60) Provisional application No. 60/236,558, filed on Sep. 28, 2000.

(51) Int. Cl.
    *G09G 5/08* (2006.01)
(52) U.S. Cl. .................. 345/156; 345/157; 715/701
(58) Field of Classification Search ............... 345/156, 345/157, 158, 168, 169, 163, 164, 165, 166, 345/167, 700, 701, 702
    See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Culter |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 4,127,752 A | 11/1978 | Lowthorp |
| 4,160,508 A | 7/1979 | Salisbury, Jr. |
| 4,236,325 A | 12/1980 | Hall et al. |
| 4,262,549 A | 4/1981 | Schwellenbach |
| 4,333,070 A | 6/1982 | Barnes |
| 4,414,984 A | 11/1983 | Zarudiansky |
| 4,464,117 A | 8/1984 | Foerst |
| 4,484,191 A | 11/1984 | Vavra |
| 4,513,235 A | 4/1985 | Acklam et al. |
| 4,581,491 A | 4/1986 | Boothroyd |

(Continued)

FOREIGN PATENT DOCUMENTS

EP        0265011         4/1988

(Continued)

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

(Continued)

*Primary Examiner*—Xiao Wu
(74) *Attorney, Agent, or Firm*—Thelen Reil & Priest LLP; David B. Ritchie

(57) ABSTRACT

A haptic feedback interface device and actuator assembly providing inertial tactile sensations. An interface device includes a housing that is physically contacted by a user, a sensor device detecting said manipulation of the interface device by the user, and an actuator assembly of the present invention. The assembly includes an actuator operative to output a force and a mechanism coupling the actuator to the device housing. The mechanism allows the actuator to be moved and act as an inertial mass when in motion to provide an inertial force that is transmitted to the user. The mechanism includes at least two separated portions, each of the portions coupled to a different portion of the actuator. The mechanism is preferably a flexure having at least two flex joints.

35 Claims, 8 Drawing Sheets

U.S. PATENT DOCUMENTS

| | | |
|---|---|---|
| 4,599,070 A | 7/1986 | Hladky et al. |
| 4,706,294 A | 11/1987 | Ouchida |
| 4,708,656 A | 11/1987 | de Vries et al. |
| 4,713,007 A | 12/1987 | Alban |
| 4,731,603 A | 3/1988 | McRae et al. |
| 4,794,392 A | 12/1988 | Selinko |
| 4,795,296 A | 1/1989 | Jau |
| 4,868,549 A | 9/1989 | Affinito et al. |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,103,404 A | 4/1992 | McIntosh |
| 5,107,262 A | 4/1992 | Cadoz et al. |
| 5,146,566 A | 9/1992 | Hollis, Jr. et al. |
| 5,165,897 A | 11/1992 | Johnson |
| 5,175,459 A | 12/1992 | Danial et al. |
| 5,184,319 A * | 2/1993 | Kramer .................. 703/5 |
| 5,186,629 A | 2/1993 | Rohen |
| 5,186,695 A | 2/1993 | Mangseth et al. |
| 5,203,563 A | 4/1993 | Loper, III |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,296,871 A | 3/1994 | Paley |
| 5,299,810 A | 4/1994 | Pierce et al. |
| 5,309,140 A | 5/1994 | Everett, Jr. et al. |
| 5,334,027 A | 8/1994 | Wherlock |
| 5,354,162 A | 10/1994 | Burdea et al. |
| 5,388,992 A | 2/1995 | Franklin et al. |
| 5,399,091 A | 3/1995 | Mitsumoto |
| 5,405,152 A | 4/1995 | Katanics et al. |
| 5,436,622 A | 7/1995 | Gutman et al. |
| 5,437,607 A | 8/1995 | Taylor |
| 5,440,183 A | 8/1995 | Denne |
| 5,466,213 A | 11/1995 | Hogan et al. |
| 5,547,382 A | 8/1996 | Yamasaki et al. |
| 5,565,840 A | 10/1996 | Thorner et al. |
| 5,575,761 A | 11/1996 | Hajianpour |
| 5,580,251 A | 12/1996 | Gilkes et al. |
| 5,583,478 A | 12/1996 | Renzi |
| 5,587,937 A | 12/1996 | Massie et al. |
| 5,589,828 A | 12/1996 | Armstrong |
| 5,619,180 A | 4/1997 | Massimino et al. |
| 5,631,861 A | 5/1997 | Kramer |
| 5,643,087 A | 7/1997 | Marcus et al. |
| 5,661,446 A | 8/1997 | Anderson et al. |
| 5,669,818 A | 9/1997 | Thorner et al. |
| 5,684,722 A | 11/1997 | Thorner et al. |
| 5,690,582 A | 11/1997 | Ulrich et al. |
| 5,709,219 A | 1/1998 | Chen et al. |
| 5,714,978 A | 2/1998 | Yamanaka et al. |
| 5,734,373 A | 3/1998 | Rosenberg et al. |
| 5,736,978 A | 4/1998 | Hasser et al. |
| 5,739,811 A | 4/1998 | Rosenberg et al. |
| 5,742,278 A | 4/1998 | Chen et al. |
| 5,754,023 A | 5/1998 | Roston et al. |
| 5,766,016 A | 6/1998 | Sinclair et al. |
| 5,781,172 A | 7/1998 | Engel et al. |
| 5,784,052 A | 7/1998 | Keyson |
| 5,785,630 A | 7/1998 | Bobick et al. |
| 5,790,108 A | 8/1998 | Salcudean et al. |
| 5,805,140 A | 9/1998 | Rosenberg et al. |
| 5,857,986 A | 1/1999 | Moriyasu |
| 5,889,672 A | 3/1999 | Schuler et al. |
| 5,894,263 A | 4/1999 | Shimakawa et al. |
| 5,897,437 A | 4/1999 | Nishiumi et al. |
| 5,914,705 A | 6/1999 | Johnson et al. |
| 5,945,772 A | 8/1999 | Macnak et al. |
| 5,973,670 A | 10/1999 | Barber et al. |
| 5,984,880 A | 11/1999 | Lander et al. |
| 5,986,643 A | 11/1999 | Harvill et al. |
| 6,001,014 A | 12/1999 | Ogata et al. |
| 6,004,134 A | 12/1999 | Marcus et al. |
| 6,044,646 A | 4/2000 | Silverbrook |
| 6,078,126 A | 6/2000 | Rollins et al. |
| 6,088,017 A | 7/2000 | Tremblay et al. |
| 6,088,019 A | 7/2000 | Rosenberg |
| 6,104,158 A | 8/2000 | Jacobus et al. |
| 6,111,577 A | 8/2000 | Zilles et al. |
| 6,160,489 A | 12/2000 | Perry et al. |
| 6,184,868 B1 | 2/2001 | Shahoian et al. |
| 6,198,206 B1 | 3/2001 | Saarmaa et al. |
| 6,211,861 B1 | 4/2001 | Rosenberg et al. |
| 6,275,213 B1 | 8/2001 | Tremblay et al. |
| RE37,374 E | 9/2001 | Roston et al. |
| 6,317,032 B1 | 11/2001 | Oishi |
| 6,422,941 B1 | 7/2002 | Thorner et al. |
| 6,424,333 B1 | 7/2002 | Tremblay et al. |
| 6,585,595 B1 | 7/2003 | Soma et al. |
| 6,686,901 B2 * | 2/2004 | Rosenberg .................. 345/156 |
| 6,697,043 B1 | 2/2004 | Shahoian et al. |
| 6,707,443 B2 | 3/2004 | Bruneau et al. |
| 6,717,573 B1 | 4/2004 | Shahoian et al. |
| 2002/0030663 A1 | 3/2002 | Tierling et al. |
| 2003/0201975 A1 | 10/2003 | Bailey et al. |

FOREIGN PATENT DOCUMENTS

| | | |
|---|---|---|
| EP | 0 349 086 A1 | 1/1990 |
| EP | 0626634 A2 | 5/1994 |
| EP | 0607580 A1 | 7/1994 |
| JP | H2-185278 | 7/1990 |
| JP | H4-8381 | 1/1992 |
| JP | H5-192449 | 8/1993 |
| JP | H7-24147 | 1/1995 |
| WO | WO 92/00559 | 1/1992 |
| WO | WO 97/31333 | 8/1997 |
| WO | WO 98/32112 | 7/1998 |
| WO | WO 99/40504 | 12/1999 |
| WO | WO 01/03105 | 1/2001 |
| WO | WO 01/13354 | 2/2001 |
| WO | WO 01/24158 | 4/2001 |
| WO | WO 02/27705 | 4/2002 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Relating Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug., 1990.

Kontarinis et al., "Tactile Display of Vibratory Information in Teleoperation and Virtual Environments," PRESENCE, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," $2^{nd}$ Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/Issue21/greviews/cyberman.html, 1994.

"Component Maintenance Manual With Illustrated Parts List, Coaxial Control Shaker Part No. C-25502," Safe Right Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance In Telepresence Tasks," *Ph.D. Dissertation*, Stanford University, Jun. 1994.

Schmult, Brian et al., "Application Areas for a Force-Feedback Joystick," ASME 1993, DSC-vol. 49, pp. 47-54.

Hasser, Christopher John, "Tactile Feedback for a Force-Reflecting Haptic Display," The School of Engineering, University of Dayton, Dec. 1995, pp. iii-xii &1-96.

Akamatsu, M. et al., "Multimodal Mouse: A Mouse-Type Device with Tactile and Force Display," Presence, vol. 3, No. 1, 1994, pp. 73-80.

Kelley, A. J. et al., "MagicMouse: Tactile and Kinesthetic Feedback in the Human-Computer Interface using an Electromagnetically Actuated Input/Output Device," Dept. of Elec. Eng., Univ. of Brit. Columbia, 1993, pp. 1-27.

Hasser, C. et al., "Tactile Feedback with Adaptive Controller for a Force-Reflecting Haptic Display," Parts 1&2, IEEE 0-7803-3131-1, 1996, pp. 526-533.

Ramstein, C., "Combining Haptic and Braille Technologies: Design Issues and Pilot Study," ASSETS '96, 2nd Annual ACM Conf. on Assistive Technologies, 1996, pp. 37-44.

Dennerlein, et al., "Vibrotactile Feedback for Industrial Telemanipulators," ASME IMECE, 6th Annual Symp. On Haptic Interfaces for Virtual Environment and Teleoperator Systems, Nov. 1997, pp. 1-7.

Minsky, Margaret et al., "Feeling and Seeing: Issues in Force Display," ACM 089791-351-5, 1990, pp. 235-242.

Ouh-Young, M. et al., "Creating an Illusion of Feel: Control Issues in Force Display," Computer Science Dept., University of North Carolina, 1989, pp. 1-14.

Hasser, C., "Force-Reflecting Anthropomorphic Hand Masters," AL/CF-TR-1995-0110, 1995, pp. 5-31.

Kim, Won, "Telemanipulator Technology and Space Telerobotics," SPIE Proceedings, 1993, vol. 2057, pp. 40-50.

* cited by examiner

DEVICE AND ASSEMBLY FOR PROVIDING LINEAR TACTILE SENSATIONS

CROSS REFERENCE TO RELATED APPLICATIONS

This application claims the benefit of U.S. Provisional Application No. 60/236,558, filed Sep. 28, 2000, entitled, "Device and Assembly for Providing Linear Inertial Tactile Sensations," which is incorporated herein by reference in its entirety.

BACKGROUND OF THE INVENTION

The present invention relates generally to interface devices for allowing humans to interface with computer systems, and more particularly to low-cost computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), navigate web pages, etc. Common human-computer interface devices used for such interaction include a mouse, joystick, trackball, gamepad, remote control, steering wheel, stylus, tablet, pressure-sensitive sphere, or the like, that is in communication with the computer system controlling the computer environment. The computer updates the environment in response to the user's manipulation of a physical manipulandum such as a joystick handle, button, or mouse, and provides visual and audio feedback to the user utilizing the display screen and audio speakers. The computer senses the user's manipulation of the user object through sensors provided on the interface device that send locative signals to the computer.

In some interface devices, force (kinesthetic) feedback and/or tactile feedback is also provided to the user, more generally known collectively herein as "haptic feedback." These types of interface devices can provide physical sensations which are felt by the user manipulating a user manipulandum of the interface device. One or more motors or other actuators are coupled to the manipulandum and are connected to the controlling computer system. The computer system controls forces on the manipulandum in conjunction and coordinated with computer events and interactions by sending control signals or commands to the actuators. The computer system can thus convey physical force sensations to the user in conjunction with other supplied feedback as the user is grasping or contacting the interface device or manipulatable object of the interface device.

One problem with current haptic feedback controllers in the home consumer market is the high manufacturing cost of such devices, which makes the devices expensive for the consumer. A large part of this manufacturing expense is due to the inclusion of complex actuators and corresponding control electronics in the haptic feedback device. In addition, high quality mechanical and force transmission components such as linkages and bearings must be provided to accurately transmit forces from the actuators to the user manipulandum and to allow accurate sensing of the motion of the user object. These components are complex and require greater precision in their manufacture than many of the other components in an interface device, and thus further add to the cost of the device.

Some low cost haptic devices exist, such as the tactile gamepads for console game systems and personal computers. These devices generate tactile sensations by including a motor having a rotating shaft and an inertial mass connected to the shaft at an off-center point of the mass. The inertial mass is rotated around the motor shaft with respect to the interface device at various speeds. The problem with such a methodology is slow response time because the spinning mass must accelerate and decelerate over time to achieve the rotational velocity corresponding to a desired frequency output. Also, this implementation applies forces in a continually changing direction confined to a plane of rotation of the mass, providing a "wobble" sensation. This can be particularly disconcerting to the user at slow frequencies.

A need therefore exists for a haptic feedback device that is lower in cost to manufacture yet offers the user compelling haptic feedback to enhance the interaction with computer applications.

SUMMARY OF THE INVENTION

The present invention is directed toward an actuator assembly and an interface device including such an assembly that provides haptic sensations to a user. Inertial forces are applied to a user with a low-cost actuator and mechanical structure, which allows a low-cost haptic feedback device to be produced.

More particularly, a haptic feedback interface device of the present invention, such as a mouse or gamepad, is coupled to a host computer implementing a host application program and is manipulated by a user. The interface device includes a housing that is physically contacted by the user, a sensor device detecting said manipulation of said interface device by the user, and an actuator assembly of the present invention, including an actuator operative to output a force and a mechanism coupling the actuator to the device housing. The mechanism allows the actuator to be moved and act as an inertial mass when in motion to provide an inertial force that is transmitted to the user. The mechanism includes at least two separated portions, each of the portions coupled to a different portion of the actuator.

In a described embodiment, the mechanism includes a flexure having at least two flex joints. The force output by the actuator can be a rotary force, and the separate portions of the mechanism can be coupled to a rotating shaft of the actuator and to a housing of the actuator. The actuator can be approximately linearly moved with respect to the device housing to provide a linear inertial force. One of the portions of the flexure can include a rotating member coupled to the housing by a flex joint, and one of the portions of the flexure can include a collar coupled to a housing of the actuator and a flex joint coupling the collar to the housing. The actuator can be moved bi-directionally to produce pulse and vibration sensations to the user.

The present invention advantageously provides a haptic feedback device that is significantly lower in cost than other types of haptic feedback devices and is thus well-suited for home consumer applications. One or more low-cost actuator assemblies of the present invention can be provided that apply a force in a particular direction or degree of freedom. A flexure is used is some embodiments to provide long-lasting and effective haptic sensations, and the actuator itself can be used as an inertial mass for inertial haptic sensations, saving cost and assembly time.

These and other advantages of the present invention will become apparent to those skilled in the art upon a reading of the following specification of the invention and a study of the several figures of the drawing.

DETAILED DESCRIPTION OF PREFERRED EMBODIMENTS

The present invention is addressed to inertial haptic feedback in interface devices. A mouse and a gamepad, described below in FIGS. 1a and 1b, are just two of the possible interface devices that can be used with the present invention.

Figure 1A:
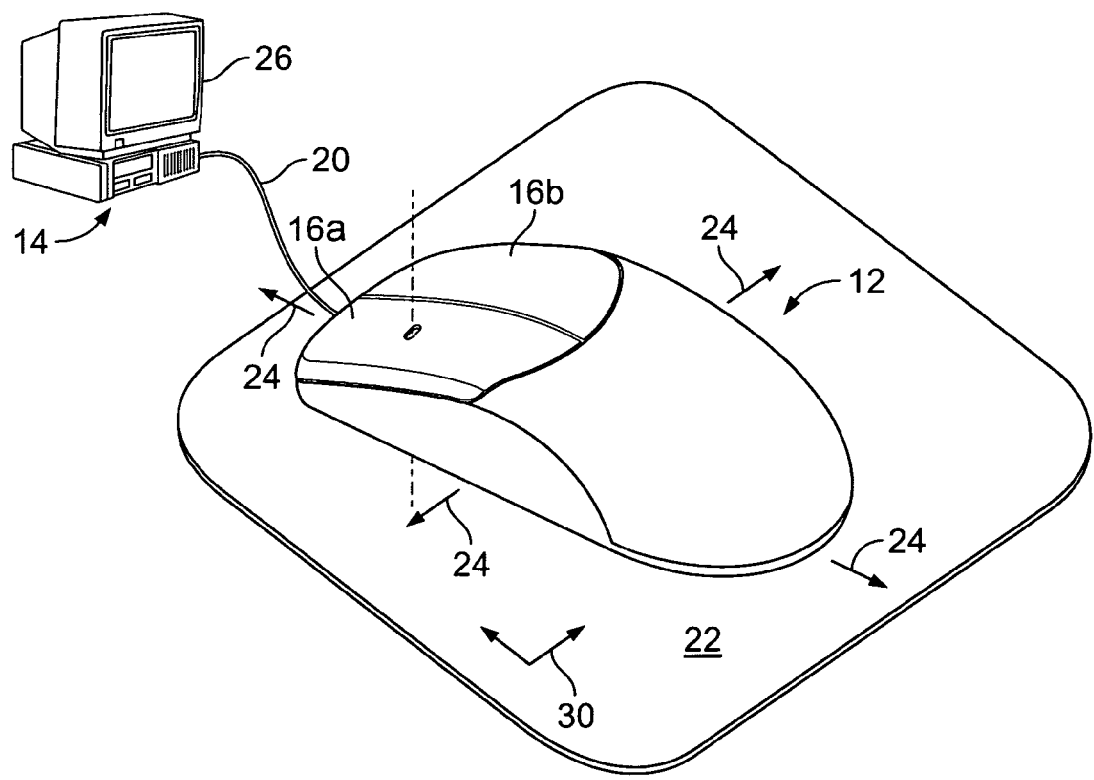
FIG. 1a is a perspective view of a haptic feedback mouse interface system suitable for use with the present invention.
Figure 1B:
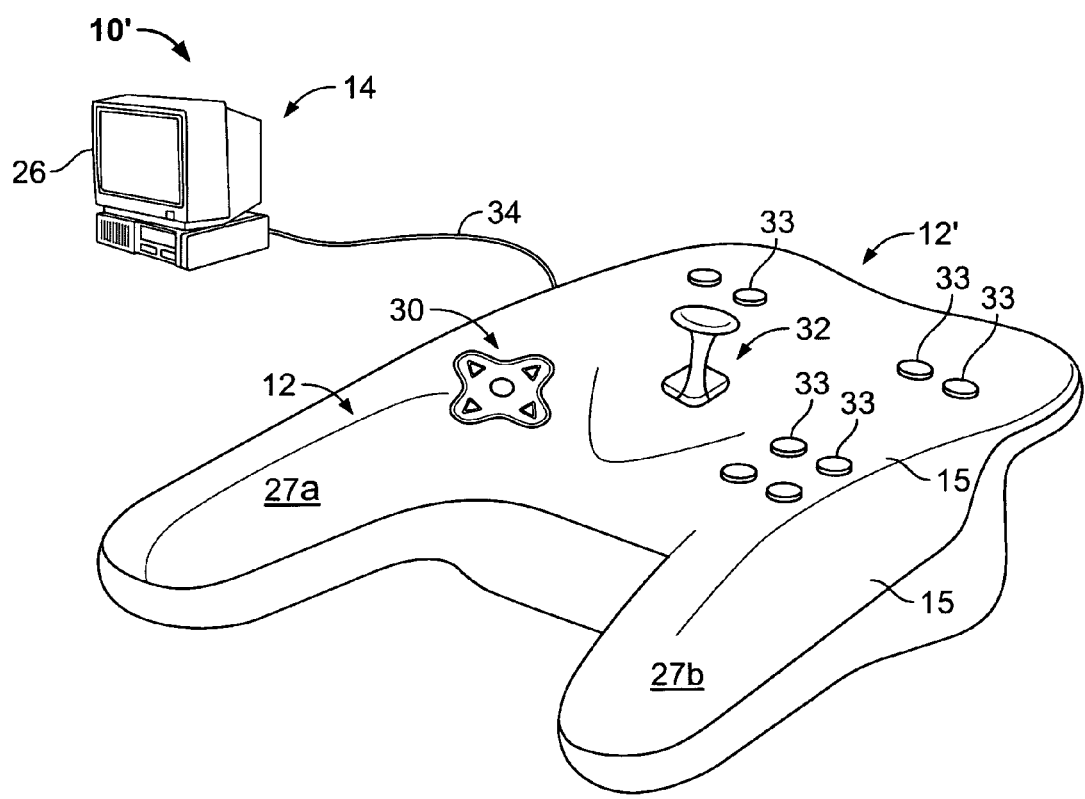
FIG. 1b is a perspective view of a haptic feedback gamepad interface system suitable for use with the present invention.

FIG. 1a is a perspective view of a haptic feedback interface system 10 of the present invention capable of providing input to a host computer based on the user's manipulation of a device and capable of providing haptic feedback to the user of the system based on events occurring in a program implemented by the host computer. System 10, as shown, includes a mouse 12 and a host computer 14. It should be noted that the term "mouse" as used herein, indicates an object generally shaped to be grasped or contacted by the user and moved within a substantially planar workspace (and additional degrees of freedom if available). Typically, a mouse is a smooth- or angular-shaped compact unit that snugly fits under a user's hand, fingers, and/or palm, but can also be implemented as a grip, finger cradle, cylinder, sphere, planar object, etc.

Mouse 12 is an object that is preferably grasped, gripped, or otherwise contacted and manipulated by a user. For example, a user can move mouse 12 to provide planar two-dimensional input to a computer system to correspondingly move a computer generated graphical object, such as a cursor or other image, in a graphical environment provided by computer 14 or to control a virtual character, vehicle, or other entity in a game or simulation. In addition, mouse 12 can include one or more buttons 16a and 16b to allow the user to provide additional commands to the computer system.

Mouse 12 preferably includes an actuator assembly of the present invention which is operative to produce forces on the mouse 12 and haptic sensations to the user, as described in greater detail below.

Mouse 12 rests on a ground surface 22 such as a tabletop or mousepad. A user grasps the mouse 12 and moves the mouse in a planar workspace on the surface 22 as indicated by arrows 24. Mouse 12 also preferably includes a sensor system for sensing motion of the mouse in its planar degrees of freedom, e.g. along the X and Y axes. The sensing system can include a mouse ball, an optical sensor, or other sensors as is well known in the art. Mouse 12 can be a "relative" device, which, as referenced herein, is a device that reports a change in position of the device to the host computer rather than an absolute position in a fixed reference frame; or the mouse can be an absolute device if preferred.

Mouse 12 is coupled to the computer 14 by a bus 20, which communicates signals between mouse 12 and computer 14 and may also, in some embodiments, provide power to the mouse 12. Components such as the actuator assembly require power that can be supplied from an interface such as USB or Firewire (IEEE 1394) bus. In other embodiments, signals can be sent between mouse 12 and computer 14 by wireless transmission/reception. In some embodiments, the power for the actuator can be supplemented or solely supplied by a power storage device provided on the mouse, such as a capacitor or one or more batteries.

Host computer 14 is a computing device that can take a wide variety of forms. For example, computer 14 can be personal computer or workstation, such as a PC compatible computer or Macintosh personal computer, or a Sun or Silicon Graphics workstation. Such a computer 14 can operate under the Windows™, MacOS, Unix, or MS-DOS, or other operating systems. Alternatively, host computer system 14 can be one of a variety of home video game console systems commonly connected to a television set or other display, such as systems available from Nintendo, Sega, Sony, or Microsoft. In other embodiments, host computer system 14 can be a "set top box", a "network-" or "internet-computer", a portable computer or game device, PDA, arcade machine, etc. Host computer preferably includes a host microprocessor, random access memory (RAM), read only memory (ROM), input/output (I/O) circuitry, disk drives, and other components of computers well-known to those skilled in the art.

Host computer 14 preferably implements a host application program with which a user is interacting via mouse 12 and other peripherals, if appropriate, and which may include haptic feedback functionality. For example, the host application program can be a drawing/CAD program, video game, word processor or spreadsheet, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Linux, Be, etc. are also referred to as "application programs." In one preferred embodiment, an application program utilizes a graphical user interface (GUI) to present options to a user and receive input from the user. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. The host application program checks for input signals derived from the electronics and sensors of mouse 12, and outputs force values and/or commands to be converted into forces output for mouse 12. Suitable software drivers which interface software with haptic feedback devices are available from Immersion Corporation of San Jose, Calif.

Display device 26 can be included in host computer system 14 and can be a standard display screen (LCD, CRT, flat panel, etc.), 3-D goggles, projection device, or any other visual output device. Typically, the host application provides images to be displayed on display device 26 and/or other feedback, such as auditory signals.

The haptic feedback system 10 can include a wide variety of architectures. For example, in some embodiments, the host computer 14 controls the output of actuators on the mouse 12 directly by streaming force values to the mouse 12. In other embodiments, a local microprocessor on the mouse 12 can receive high level commands from the host 14 and provide the force values to the actuator based on the host commands and local force processes. These implementations, and variations thereof, are described in U.S. Pat. No. 6,211,861, incorporated herein by reference in its entirety.

In other embodiments, many other types of interface or control devices may be used with the present inventions described herein. For example, a trackball, a joystick handle, steering wheel, knob, stylus, gun-shaped targeting device, or other device can benefit from inertial force sensations. In addition, handheld devices are quite suitable for use with the presently-described inventions, such as handheld remote control device, gamepad controller for video games or computer games, or handheld electronic device or computer can be used with the haptic feedback components described herein. Handheld devices are not constrained to a planar workspace like a mouse but can still benefit from the sensations described herein which, for example, can be output perpendicularly from a device's surface or which can be output on a joystick handle, trackball, stylus, grip, wheel, or other manipulatable object on the device, or in a desired direction.

FIG. 1b is a perspective view of another embodiment of an interface device which can be used with the present invention, a gamepad system 10'. System 10' includes a gamepad interface device 12' and a host computer 14. Gamepad device 12' is in the form of a handheld controller, e.g. of similar shape and size to many gamepads currently available for video game console systems. A housing 15 of the interface device 10 is shaped to easily accommodate two hands gripping the device at the gripping projections 27a and 27b. In the described embodiment, the user accesses the various controls on the device 12' with his or her fingers.

A direction pad 30 can be included on device 12' to allow the user to provide directional input to the host computer 14. One or more finger joysticks 32 can be included that project out of a surface of the housing 15 to be manipulated by the user in one or more degrees of freedom. In some embodiments, additional linear or spin degrees of freedom can be provided for the joystick, and/or a sphere can be provided instead of or in addition to the joystick 32 to provide directional input. Buttons 33 allow additional input. Other controls may also be placed within easy reach of the hands grasping the housing 15. For example, one or more trigger buttons can be positioned on the underside of the housing and can be pressed by the fingers of the user. Other controls can also be provided on various locations of the device 12, such as a dial or slider for throttle control in a game, a four- or eight-way hat switch, knobs, trackballs, a roller or sphere, etc. Inertial haptic sensations provided on the housing are described in greater detail below.

Gamepad interface device 12' can coupled to host computer 14 by a bus 34, which can be similar to the connection bus described above for FIG. 1a. Host computer 14 is preferably a video game console, personal computer, workstation, or other computing or electronic device as described above. Display device 26 can be included in host computer 14 and can be a standard display screen (LCD, CRT, flat panel, etc.), 3-D goggles, projection display device (e.g., projector or heads-up display in a vehicle), or any other visual output device, as described above.

Figure 2A:
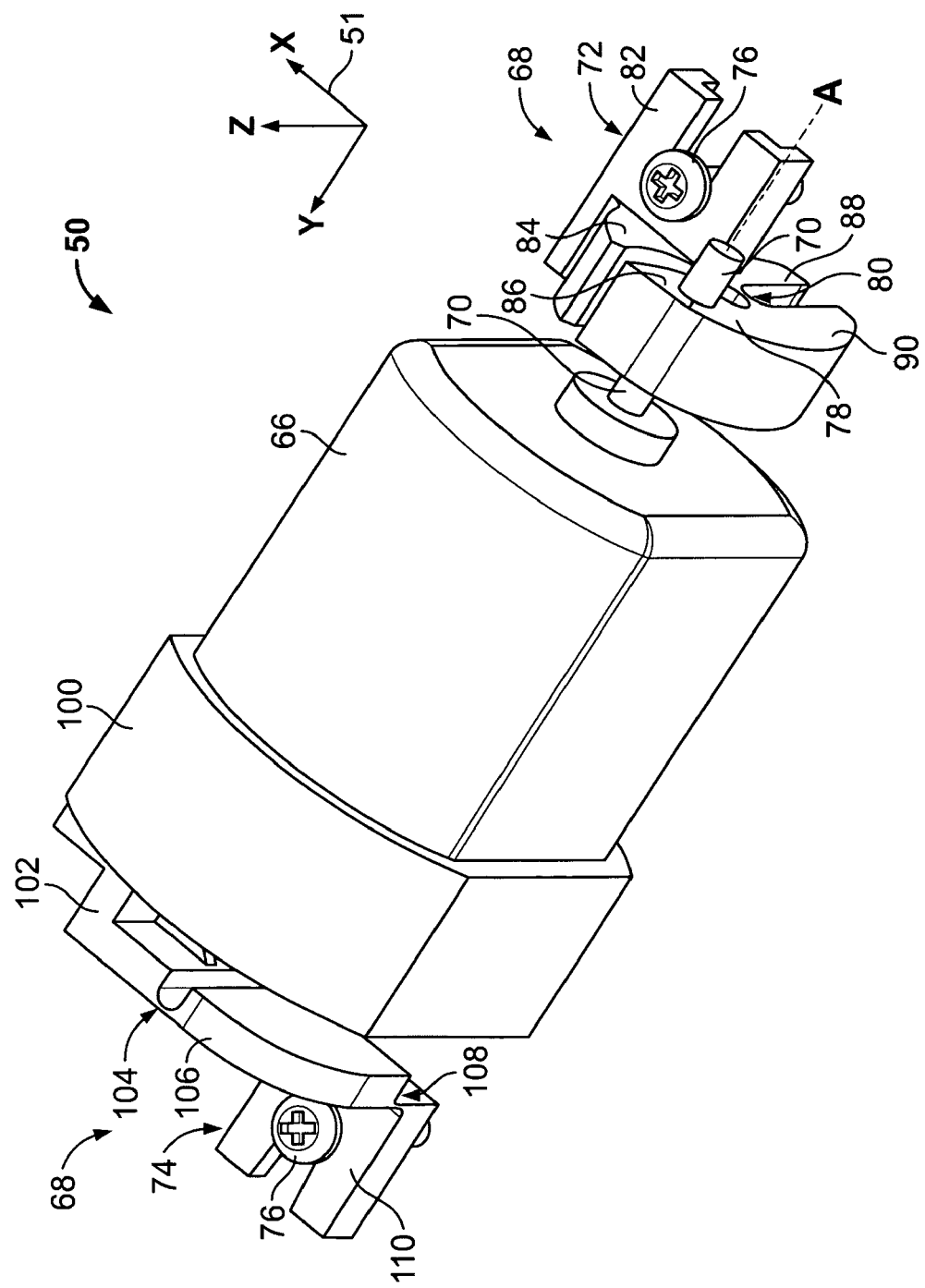
FIGS. 2a and 2b are perspective views of an actuator assembly of the present invention which can be placed inside the housing of an interface device.
Figure 2B:
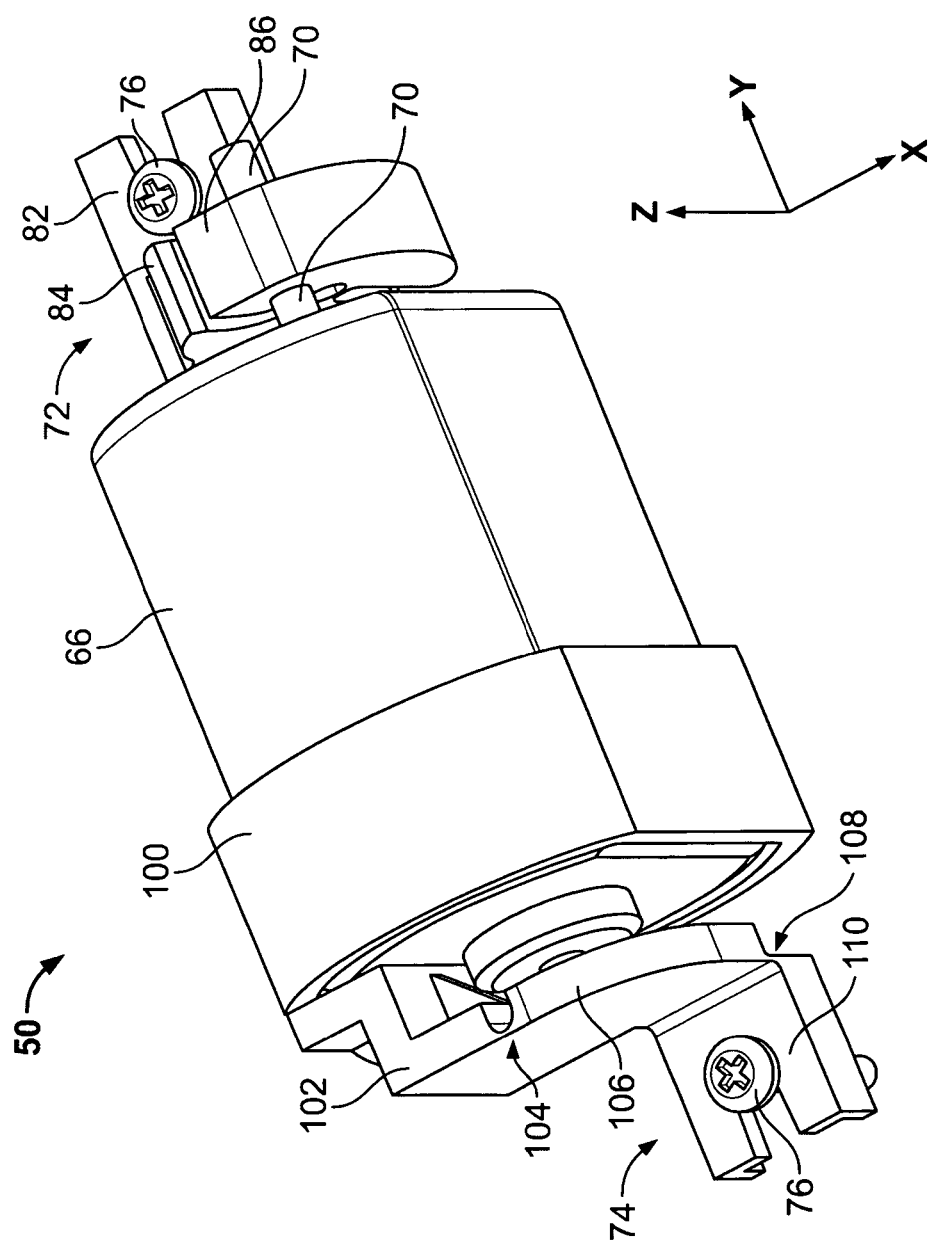
Figure 2C:
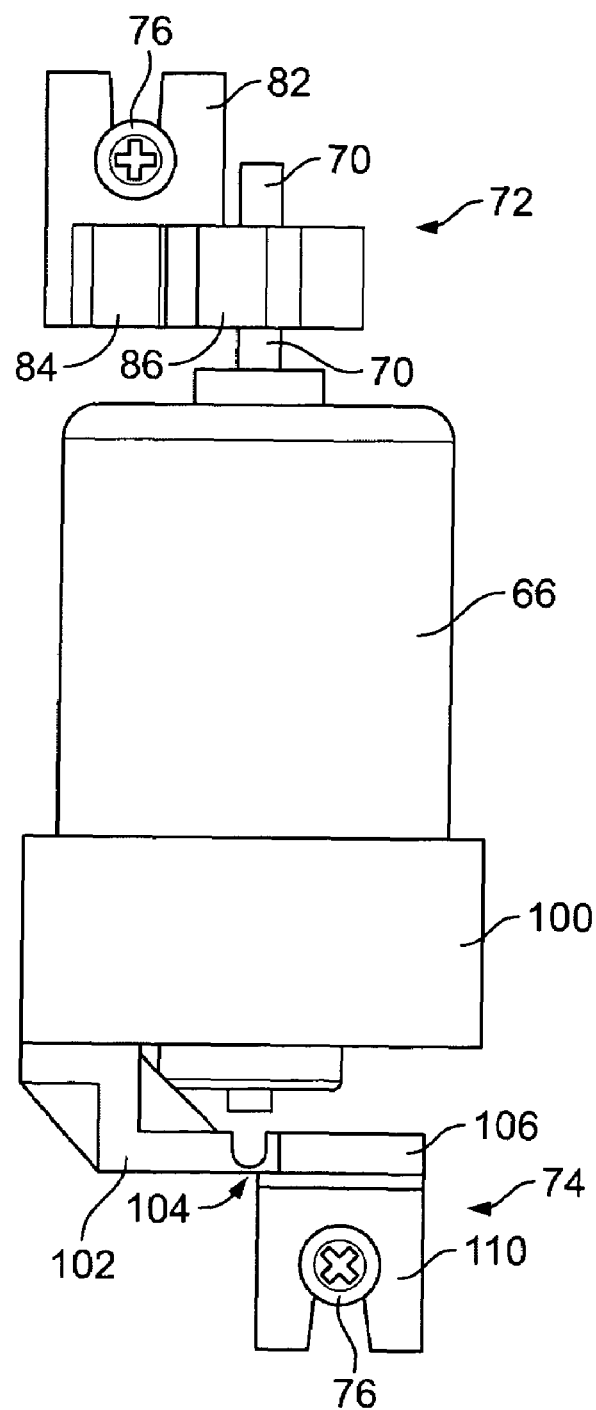
FIGS. 2c–2d are top and side views, respectively, of the actuator assembly of FIGS. 2a–2b.
Figure 2D:
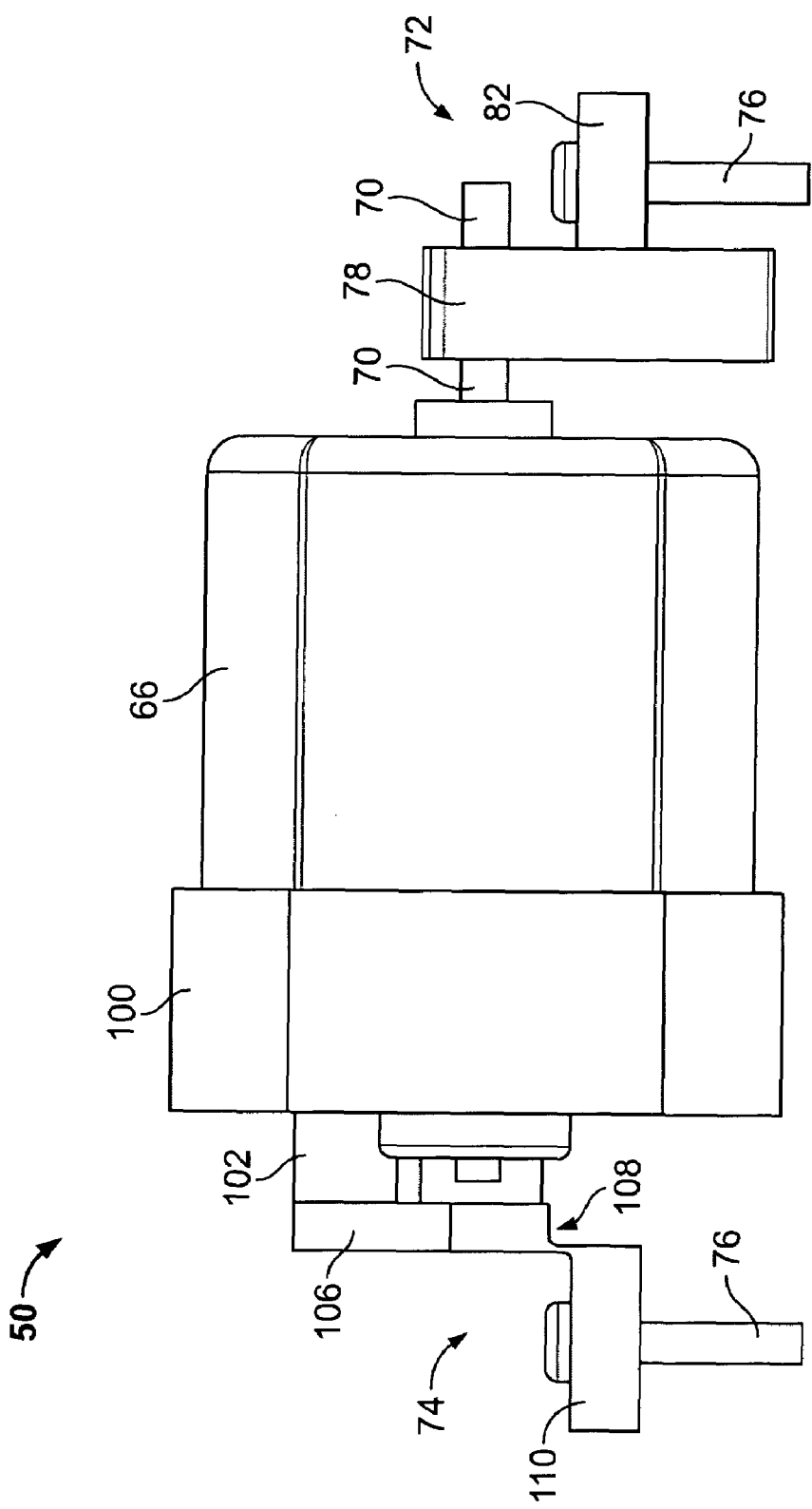

FIGS. 2a and 2b are perspective views of an actuator assembly 50 of the present invention which can be placed inside the housing of an interface device 12 such as a mouse, a gamepad, remote control, or other device. FIGS. 2c–2d are top and side views, respectively, of the actuator assembly 50. Many aspects and advantages of the present invention are similar to those described for the invention disclosed in copending application Ser. No. 09/585,741, which is incorporated herein by reference in its entirety.

The assembly 50 can be coupled to the inside of the housing of an interface device, such as the bottom portion of a mouse housing, or the inner housing surface of a grip of a gamepad device (or one assembly in each of two gamepad grips), or other feature of a device. Since the assembly 50 has a size substantially determined by the size of the actuator used, an actuator can be chosen which has the dimensions to fit into a desired space. Space should also be allowed for the movement of the actuator.

The assembly 50 is operative to output linear oscillating inertial forces substantially along the x-axis 51 shown in FIG. 2a. The assembly 50 can be placed at any angle or orientation in a device; since the assembly 50 outputs forces substantially linearly along a single axis, the assembly can be positioned so that the forces are directed along a desired axis. For example, for a mouse device, the forces are advantageously output along a vertical axis perpendicular to the plane of mouse movement. The x-axis 51 can therefore be oriented in such a perpendicular direction. In a gamepad device, the x-axis 51 can be oriented in a direction in which the forces are more effectively output; often, this is the direction perpendicular to the horizontal plane of the gamepad in which the device is generally held.

Actuator assembly 50 includes an actuator 66 and a flexure mechanism ("flexure") 68. In the preferred embodiment, the actuator 66 acts as an inertial mass, so that a separate inertial mass is not required. Actuator 66 can be a rotary DC motor, as shown, which is narrowly constructed to fit into a narrow space. The actuator 66 can be energized to rotate a shaft 70.

Flexure mechanism 68 includes two separated portions 72 and 74, where each portion is placed on an opposite side of the actuator 66. Each portion 72 and 74 is preferably a single, unitary piece made of a material such as polypropylene plastic ("living hinge" material) or other flexible material. This type of material is durable and allows flexibility of the flex joints (hinges) in the flexure when one of the dimensions of the joint is made small, but is also rigid in the other dimensions, allowing structural integrity as well as flexibility depending on thickness. The portions 72 and 74 are each grounded to the interface device housing (or other grounded member) by screws 76.

Flexure portion 72 includes a rotating member 78, a flexure joint 80, and a grounded member 82. Rotating member 78 is rigidly coupled to the rotating shaft 70 of the actuator 66. Flexure joint 80 couples the rotating member 78 to the grounded member 82. Furthermore, the portion 72 preferably includes a clockwise stop 84 coupled to the ground member 82, a stop 86 coupled to the rotating member 78 that engages the stop 84, a counterclockwise stop 88 coupled to the grounded member 82, and a stop 90 coupled to the rotating member 78 that engages the stop 88. The grounded member 82 is rigidly attached to a ground surface (e.g. the device housing) by a screw 76 or other equivalent fastener.

Flexure portion 74 includes a collar 100, a linking member 102, an intermediate member 106, and a ground member 110. The collar 100 is fitted on the end of the actuator 66 to firmly grip the actuator housing. Other types of couplings, carriages, or fasteners can be used in other embodiments to couple the portion 74 to the actuator. The linking member 102 is rigidly coupled to the collar 100, and the intermediate member 106 is coupled to the linking member 102 by a flex joint 104. The intermediate member is coupled at its other end to the ground member 110 by another flex joint 108. The ground member 110 is rigidly attached to the ground surface by a screw 76 or other equivalent fastener.

The actuator assembly 50 operates as follows. The actuator 66 rotates the shaft 70 harmonically (in two directions) according to a control signal, such as a sine wave, square wave, etc. The flexure portions 72 and 74 are shown in FIG. 2a in their origin position, when no force from the actuator is applied. When the shaft 70 is rotated clockwise about an axis A (viewing the shaft from the portion 72 side) by the actuator, the rotating member 78 also rotates in that direction. The flex joint 80 is made thin in the z-dimension to allow this rotation. Furthermore, the flex joint 80 allows the actuator 66, shaft 70 and rotating member 78 to linearly move in the direction approximately toward the stop 84. To channel the motion of the flexure into the desired x-axis motion, the flexure portion 74 at the other end of the actuator includes flex joint 104, which is made thin along the y-axis to allow a pivoting motion of the actuator along the x-axis. In addition, since the motion of the actuator 66 is partially along the z-axis as well, the flex joint 108 is provided having a thin section along the z-axis to allow this z-axis motion. In other embodiments, the flex joint 108 can be omitted if there is enough z-axis flex in the system to allow the small amount of z-axis motion of the actuator.

Figure 3B:
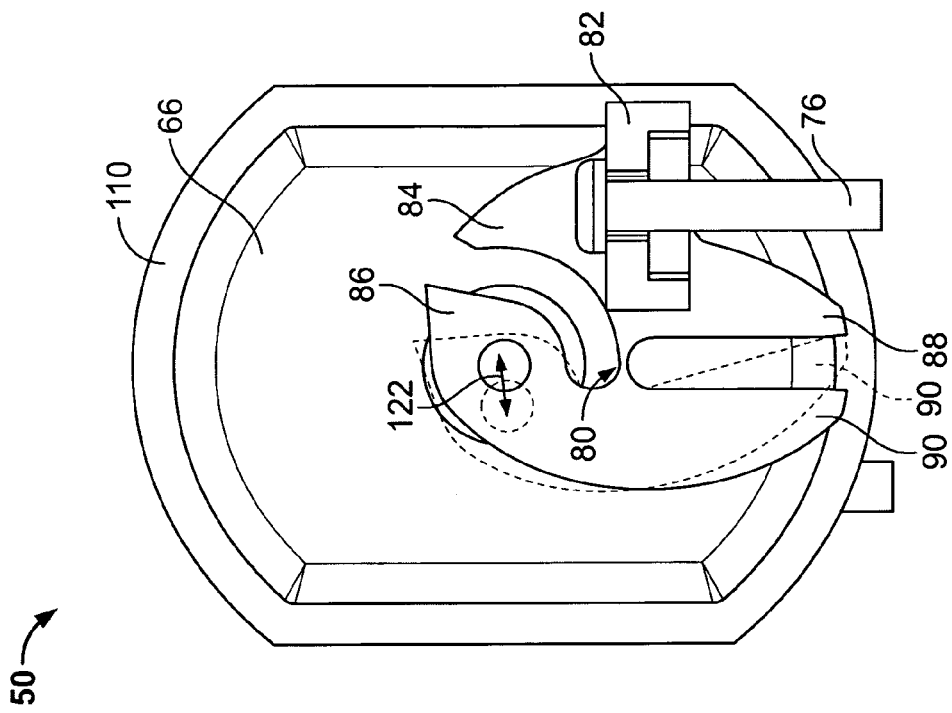
FIGS. 3a and 3b are front elevational views of the actuator assembly of FIGS. 2a–2b illustrating flexed positions of the flexure and actuator.
Figure 3A:
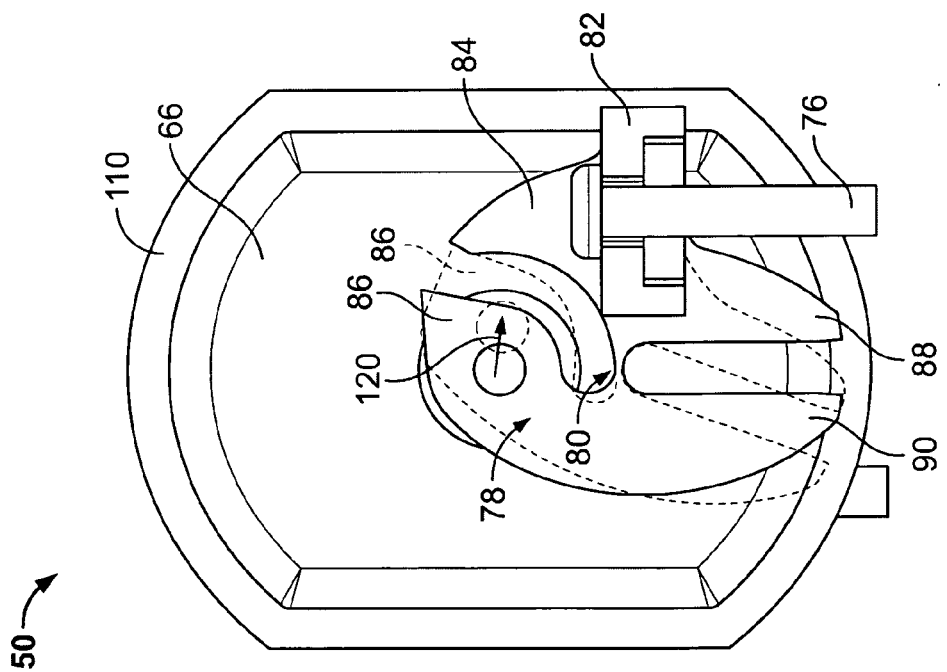

At some point, the stop 86 on the rotating member engages the stop 84 so that no further clockwise rotation is allows. This rotated position is shown as dashed lines in FIG. 3a, which is a front elevational view of the portion 72. The arrow 120 indicates the displacement of the actuator 66 and shaft 70. Other embodiments can omit the stops 84, 86, 88, and 90, and allow the physical limitations of the flex joints in the system determine the limits to motion.

When the shaft 70 is rotated counterclockwise about axis A by the actuator, the rotating member is also rotated counterclockwise. The flex joint 80 allows the rotating member 78 to rotate away from the stop 84, and also allows the rotating member 78, shaft 70 and actuator 66 to translate away from the stop 84. The flex joint 104 of the flexure portion 74 allows the actuator 66 to move along the x-axis in this fashion. The flex joint 108 allows the small amount of z-axis motion of the actuator and thus allows the actuator x-axis motion to more easily occur.

At some point, the stop 90 on the rotating member engages the grounded stop 88 so that no further counterclockwise rotation is allows. This rotated end position is shown as dashed lines in FIG. 3b, which is a front elevational view of the portion 72. The arrow 122 indicates the displacement of the actuator 66 and shaft 70.

In the preferred operation, the actuator 66 is operated in only a fraction of its rotational range when driving the rotating member 78 in two directions, allowing high bandwidth operation and high frequencies of pulses or vibrations to be output. The actuator can be driven by a harmonic forcing function, such as a sine wave, triangle wave, or square wave. As indicated above, in actuality, the actuator 66 moves only approximately linearly, since there is a small arc to the travel. However, this arc is small enough to be ignored for most practical purposes.

By quickly changing the rotation direction of the actuator shaft 70, the actuator can be made to oscillate along the z-axis and create a vibration on the mouse housing with the actuator 66 acting as an inertial mass. Preferably, enough space is provided around the actuator along the x-axis to allow its range of motion without impacting any surfaces or portions of the device housing, since such impacts typically degrade the quality of the pulse, vibrations, and other haptic sensations output to the user.

The haptic sensation output can be of varying quality depending on the initial direction of motion of the inertial mass (either a separate inertial mass or the actuator as the mass). For example, the inertial mass preferably is provided in an origin position when at rest, where a spring compliance biases the mass toward the origin position. In some embodiments, the origin position of the inertial mass may not be in the center of the range of motion of the mass, so that a greater distance exists from the origin position to a range limit on one side of the origin position than on the other side. Furthermore, even if the mass is centered in its range at the origin position when the actuator assembly is initially manufactured, the origin position may shift over time due to use, e.g. if a flexure is used, one or more flex joints may become less rigid over time to allow the mass to sag slightly due to gravity, thus causing the origin position to change to a non-centered position. In such cases, an initial greater magnitude haptic sensation can be obtained in many embodiments by first moving the mass in the direction having the greater distance from origin to range limit. The greater distance allows the mass to achieve a higher velocity and thus a higher momentum, so that when the mass changes direction at the range limit, a greater change in momentum is achieved and thus a greater force is output. This provides an initial pulse (from a rest state) having greater magnitude to the user than if the inertial mass were initially driven in the direction having less distance. To ensure such greater magnitude forces, the actuator 66 driving the mass can be set to the appropriate polarity to always initially drive the mass in the direction having greater range, e.g. in some embodiments, this is the direction against gravity.

A variety of tactile sensations can be output to the user with the present invention, many of which are described in greater detail in copending application Ser. No. 09/585,741. A block diagram describing a haptic feedback system which is suitable for use with the present invention is described below.

In addition, the flex joints included in flexure portions 72 and 74, such as flex joints 80 and 104, act as spring members to provide a restoring force toward the origin position (rest position) of the actuator 66. This centering spring bias reduces the work required by the actuator to move itself since the actuator output force need only be deactivated once the actuator reaches a peak or valley position in its travel. The spring bias brings the actuator back to its rest position without requiring actuator force output. In addition, having a spring-biased center position is essential for providing linear harmonic operation which will faithfully reproduce an input control signal, and which is more desirable than nonlinear operation. With this spring compliance in the system included between the moveable member and the housing of the mouse, a second order harmonic system is created. This system can be tuned so that amplification of forces output by the actuator is performed at a efficient level, e.g. near the natural frequency of the system. Tuning such a harmonic system using an inertial force actuator and compliant suspension of a moving mass is described in copending application Ser. No. 09/585,741. A system providing contact forces can also be so tuned. For example, in the flexure portions 72 and 74, the spring constants can be tuned by adjusting the thickness of the flex joints 80, 104, and 108 (in the dimension in which they are thin). In some embodiments, additional springs can be added to provide additional centering forces if desired, e.g. mechanical springs such as leaf springs.

The flexure 68 is advantageous in the present invention because it has an extremely low cost and ease of manufacturability, yet allows high-bandwidth forces to be transmitted as inertial forces. Since the flexure portions 72 and 74 are each a unitary member, they can be manufactured from a single mold, eliminating significant assembly time and cost. Furthermore, they are rigid enough to provide strong vibrations with respect to the device housing and to provide significant durability. In addition, the flexure provides close to zero backlash and does not wear out substantially over time, providing a long life to the product.

The travel stops 84 and 88 include the advantage of providing a qualitative improvement to the feel of forces experienced by the user. Since the stops preferably soften the impact when the actuator reaches a travel limit, less high-frequency forces are produced, providing a crisper and less annoying feel to the user than if the actuator were to impact the device housing as a travel limit. In addition, the travel stop or limiter can assist the motion of the actuator in the opposite direction after it has reached a limit, since it can provide more resiliency or "rebound" to the actuator than if the actuator were to impact the device housing by including more resilient materials. Furthermore, substantially quieter operation is allowed when the inertial mass is not allowed to impact the device housing. In some embodiments, the stops 84 and 88 can be provided with some compliance to improve the "feel" of an impact with the stop as experienced by the user and improve the rebounding of the mass; for example, a harsh "clacking" impact can be softened at maximum amplitude output of the actuator.

Providing the actuator 66 as the inertial mass that is driven in a particular axis has several advantages. For example, this embodiment saves the cost of providing a separate inertial mass and saves space and total weight in the device, which are important considerations in the home consumer market. Another advantage of the actuator assembly 50 is that it has a very thin profile in the x-axis dimension, making the actuator assembly 50 very suitable for use in narrow spaces such as the grips of a gamepad.

In other embodiments, some of the couplings in the assembly can be implemented with mechanical bearings rather than flex joints. In some embodiments, additional flex joints or bearings can be used to provide desired motion of the actuator.

Furthermore, a link member can connect the actuator 66 (or collar 100) to a cover portion, button, or other moving element on the device housing to provide contact forces to the user. The approximate linear motion of the actuator 66 can be used to drive a cover portion, button, or other moving contact element. For example, a link member can be rotatably coupled between the actuator and the moving element of the mouse. The link member can be coupled anywhere to the actuator or collar 100. The link member can be rotatably coupled to the actuator or member and to the moving element by mechanical bearings or other types of couplings, such as flex joints. When the actuator 66 moves along the x-axis, the moving element is also moved approximately along the x-axis and may contact the user's palm or fingers (or other body part) to provide contact forces. This embodiment also has the advantage of including both inertial forces (from the moving actuator 66) and contact forces (from the moving contact element).

Inertial forces caused by the motion of the inertial mass are applied to the housing of the mouse with respect to the inertial mass (i.e. the inertial mass acts as an inertial ground) instead of with respect to an earth ground, thereby conveying haptic feedback such as tactile sensations to the user of the mouse who is contacting the housing. Because large forces can not be applied through an inertial ground, it is desirable to compensate by using a high bandwidth actuator, i.e., an actuator that can output abrupt changes in force magnitude level. Since the human hand is more sensitive to changes in force level than to absolute force levels, a high bandwidth actuator used to convey low level forces produced with respect to an inertial ground can be quite effective in producing compelling haptic sensations. In the current actuator market, rotary actuators such as rotary DC motors are among the most inexpensive types of actuators that still allow high bandwidth operation (when driven with signals through, for example, an H-bridge type amplifier). These types of motors can also be made very small and output high magnitude forces for their size. Actuator 66 is therefore preferably a DC motor as described above. However, other types of rotary actuators can be used in other embodiments. For example, a moving magnet actuator can be used instead of a DC motor; such an actuator is described in detail in copending patent application Ser. No. 09/565,207, incorporated herein by reference. Other types of actuators can also be used, such as a stepper motor controlled with pulse width modulation of an applied voltage, a pneumatic/hydraulic actuator, a torquer (motor with limited angular range), shape memory alloy material (wire, plate, etc.), a piezo-electric actuator, etc.

In a mouse embodiment, the actuator 66 can be moved in a linear direction by the actuator 66, preferably approximately parallel to the Z-axis that is perpendicular to the planar workspace of the mouse. Tactile sensations can thus be applied at a perceptually strong level for the user without impairing the ability to accurately position a user controlled graphical object in the x and y axes of the mouse workspace. Furthermore, since the tactile sensations are directed in a third degree of freedom relative to the two-dimensional mouse planar workspace and display screen, jolts or pulses output along the Z-axis feel much more like three-dimensional bumps or divots to the user, increasing the realism of the tactile sensations and creating a more compelling interaction. For example, an upwardly-directed pulse that is output when the cursor is moved over a window border creates the illusion that the mouse is moving "over" a bump at the window border. Alternatively, directed inertial forces can be output along other axes in the planar workspace of the mouse and can be compensated for to prevent or reduce interference with the user's control of the device. One method to compensate is to actively filter imparted jitter in that workspace, as disclosed in U.S. Pat. No. 6,020,876, incorporated herein by reference; however, this implementation may add complexity and cost to the mouse device.

In the mouse embodiment, an additional challenge of applying a compelling tactile sensation to a mouse housing along the described Z axis is that the mouse sits upon a table or other surface 22. In other words, the forces applied by the actuator assembly 54 along the Z axis, with respect to the inertial mass, are countered by the normal forces applied by the table surface upon the mouse housing. One way to accommodate these countering forces is to use a flexible or semi-flexible surface between the mouse and the ground surface, such as a standard mouse pad. This type of flexible surface increases the transmissibility of the inertial forces from the actuator to the housing. In some embodiments, particular mouse pads can be provided which have a compliance tuned to amplify forces to a desired extent. Alternate embodiments can provide a (smooth-surfaced) compliant or flexible pad on the bottom of the mouse housing; or the stationary portion of the actuator 66 can be coupled to a portion of housing 50 that is different from the base or bottom portion 68 of the housing (e.g. the side of the housing), and an amount of flex is provided between the actuator-coupled portion of the housing and the base portion 68 in contact with the surface 22. For example, flexible hinges or connecting members can couple the two portions. Compliance adding to the magnitude of tactile sensations is described in copending U.S. application Ser. No. 09/675, 995, incorporated herein by reference. Handheld devices, such as gamepads, are operated from a handheld position and thus do not usually need compliance provided between the housing and a hard support surface.

Figure 4:
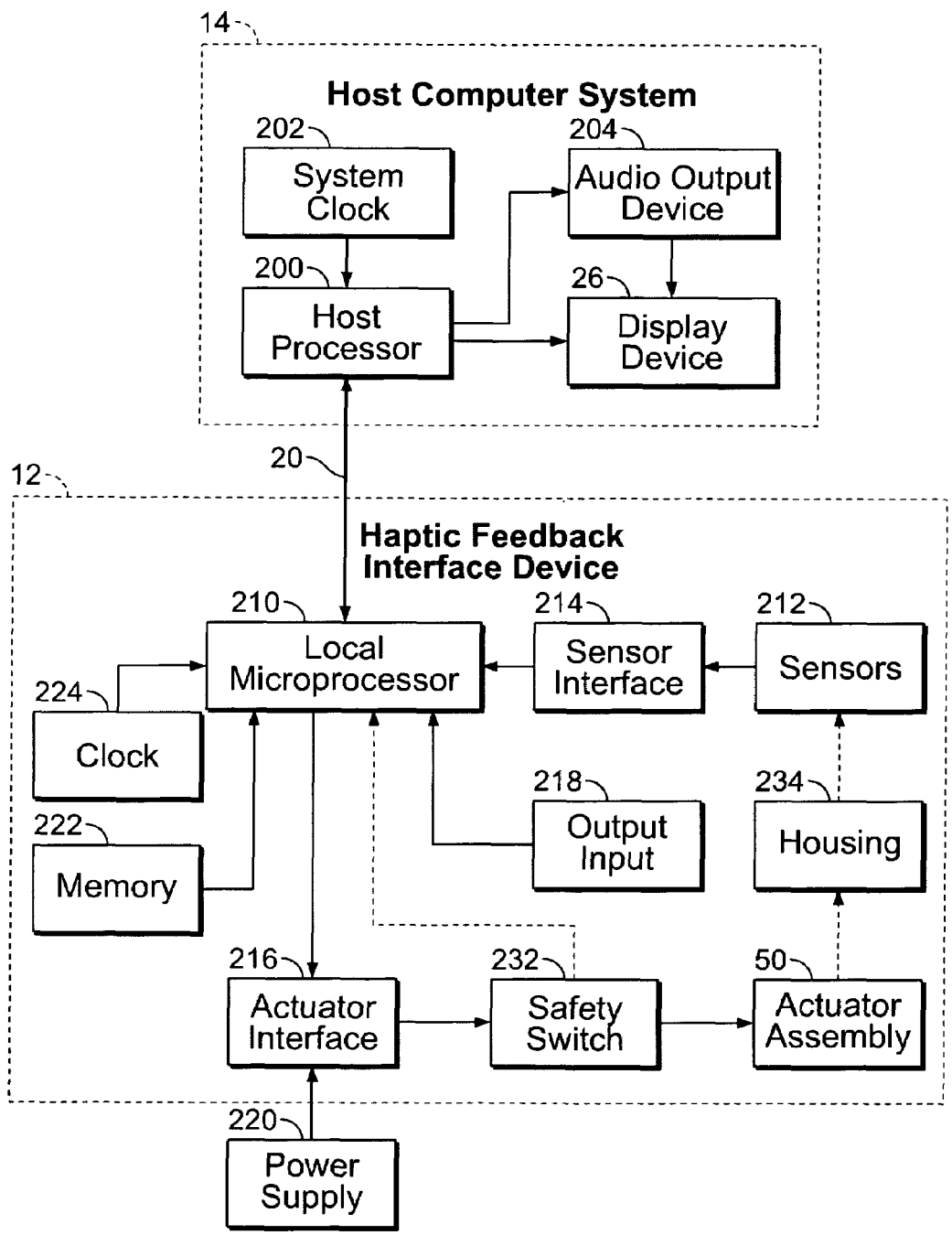
FIG. 4 is a block diagram illustrating one embodiment of a haptic feedback system suitable for use with the present invention.

FIG. 4 is a block diagram illustrating one embodiment of a haptic feedback system suitable for use with the present invention.

Host computer system 14 preferably includes a host microprocessor 200, a clock 202, a display screen 26, and an audio output device 204. The host computer also includes other well known components, such as random access memory (RAM), read-only memory (ROM), and input/output (I/O) electronics (not shown). Display screen 26 displays images of a game environment, operating system application, simulation, etc. and audio output device 204, such as speakers, provides sound output to user. Other types of peripherals can also be coupled to host processor 200, such as storage devices (hard disk drive, CD ROM drive, floppy disk drive, etc.), printers, and other input and output devices.

The interface device 12, such as a mouse, gamepad, etc., is coupled to host computer system 14 by a bi-directional bus 20. The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. Some interfaces can also provide power to the actuators of the device 12.

Device 12 can include a local processor 210. Processor 210 can be a separate microprocessor from any processors in host computer system 14. Processor 210 can be provided with software instructions to wait for commands or requests from computer host 14, decode the command or request, and handle/control input and output signals according to the command or request. In addition, processor 210 can operate independently of host computer 14 by reading sensor signals and calculating appropriate forces from those sensor signals, time signals, and stored or relayed instructions selected in accordance with a host command. Processor 210 can include one microprocessor chip, multiple processors and/or co-processor chips, and/or digital signal processor (DSP) capability.

Processor 210 can receive signals from sensor(s) 212 and provide signals to actuator assembly 50 in accordance with instructions provided by host computer 14 over bus 20. For example, in a local control embodiment, host computer 14 provides high level supervisory commands to processor 210 over bus 20, and processor 210 decodes the commands and manages low level force control loops to sensors and the actuator in accordance with the high level commands and independently of the host computer 14. This operation is described in greater detail in U.S. Pat. Nos. 5,739,811 and 5,734,373, both incorporated herein by reference. In the host control loop, force commands are output from the host computer to processor 210 and instruct the microprocessor to output a force or force sensation having specified characteristics. The local processor 210 reports data to the host computer, such as locative data that describes the position of a manipulandum in one or more provided degrees of freedom. The host computer uses the data to update executed programs. In the local control loop, actuator signals are provided from the processor 210 to actuator assembly 50 and sensor signals are provided from the sensor 212 and other input devices 218 to the processor 210. The processor 210 can process inputted sensor signals to determine appropriate output actuator signals by following stored instructions. The processor may use sensor signals in the local determination of forces to be output on the user object, as well as reporting locative data derived from the sensor signals to the host computer.

In yet other embodiments, other simpler hardware can be provided locally to device 12 as a processor to provide functionality similar to a microprocessor. For example, a hardware state machine or ASIC incorporating fixed logic can be used to provide signals to the actuator assembly 50 and receive sensor signals from sensors 212, and to output tactile signals according to a predefined sequence, algorithm, or process.

In a different, host-controlled embodiment, host computer 14 can provide low-level force commands over bus 20, which are directly transmitted to the actuator assembly 50 via processor 210 or other (e.g. simpler) circuitry. Host computer 14 thus directly controls and processes all signals to and from the device 12. In a simple host control embodiment, the signal from the host to the device can be a single bit that indicates whether to pulse the actuator at a predefined frequency and magnitude. In more complex embodiments, the signal from the host can include a magnitude, giving the strength of the desired pulse, and/or a direction. In more complex embodiments, a local processor can be used to receive a simple command from the host that indicates a desired force value to apply over time, which the processor then outputs based on the one command. A combination of these methods can be used for a single device 12.

Local memory 222, such as RAM and/or ROM, is preferably coupled to processor 210 in device 12 to store instructions for processor 210 and store temporary and other data. For example, force profiles can be stored in memory 222, such as a sequence of stored force values that can be output by the processor, or a look-up table of force values to be output based on the current position of a manipulandum. In addition, a local clock 224 can be coupled to the processor 210 to provide timing data. In embodiments using the USB communication interface, timing data for processor 210 can be alternatively retrieved from the USB signal.

Sensors 212 sense the position or motion of the device and/or one or more manipulandums or controls and provides signals to processor 210 (or host 14) including information representative of the position or motion. Sensors suitable for detecting manipulation include digital optical encoders, optical sensor systems, linear optical encoders, potentiometers, optical sensors, velocity sensors, acceleration sensors, strain gauge, or other types of sensors can also be used, and either relative or absolute sensors can be provided. Optional sensor interface 214 can be used to convert sensor signals to signals that can be interpreted by the processor 210 and/or host computer system 14, as is well known to those skilled in the art.

Actuator assembly 50 transmits forces to the housing 234 of the device 12 as described above in response to signals received from processor 210 and/or host computer 14. Actuator interface 216 can be optionally connected between actuator assembly 50 and processor 210 to convert signals from processor 210 into signals appropriate to drive actuator assembly 50, as is well known to those skilled in the art. Other input devices 218 are included in device 12 and send input signals to processor 210 or to host 14 when manipulated by the user and can include buttons, dials, switches, scroll wheels, or other controls or mechanisms. Power supply 220 can optionally be included in device 12 to provide electrical power to the actuator, or be provided as a separate component. Alternatively, power can be drawn from a power supply separate from device 12, or be received across the bus 20. Also, received power can be stored and regulated by device 12 and thus used when. A safety switch 232 can optionally be included to allow a user to deactivate actuator assembly 50 for safety reasons.

While this invention has been described in terms of several preferred embodiments, it is contemplated that alterations, permutations and equivalents thereof will become apparent to those skilled in the -art upon a reading of the specification and study of the drawings. For example, many different types of haptic sensations can be provided with the actuator assembly of the present invention and many different types of rotary actuators can be used in the actuator assembly. Different configurations of flexures can also be used which provide the essential degrees of freedom to an inertial mass or contact member. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. An apparatus, comprising:
   a housing;
   a sensor coupled to the housing, the sensor configured to detect a user manipulation of at least a portion of the housing and output sensor signals associated with the user manipulation of the portion of the housing;
   an actuator coupled to the housing, the actuator configured to output a force associated with the sensor signals;
   a first flex joint coupling a rotating shaft of the actuator to the housing and;
   a second flex joint being coupled to a portion of the actuator excluding the rotating shaft, the first flex joint and the second flex joint configured to transfer the force output from the actuator to the housing to produce a haptic feedback.

2. The apparatus of claim 1, wherein the force is a rotary force.

3. The apparatus of claim 1, wherein the force output by the actuator is associated with an approximately linear motion with respect to the housing, the haptic feedback having a linear direction associated with the linear motion of the actuator.

4. The apparatus of claim 1, wherein the housing includes a substantially flat base configured to be in contact with a support surface, the movement of the actuator being substantially perpendicular to the substantially flat base of the housing.

5. The apparatus of claim 1, wherein the housing includes a contact member configured to be contacted by a user, the contact member being coupled to the actuator and configured to transmit the force to the user.

6. The apparatus of claim 5, wherein the contact member includes at least a portion of a top surface of the housing.

7. The apparatus of claim 1, wherein the first flex joint includes a rotating member coupled to the housing.

8. The apparatus of claim 7, wherein the second flex joint includes a collar coupled to the actuator.

9. The apparatus of claim 1, wherein the actuator includes a rotating shaft having a range of motion, the first flex joint including at least one stop disposed within the range of motion of rotating shaft.

10. The apparatus of claim 1, wherein the actuator is configured to move with a bi-directional action, the force output from the actuator being associated with the bi-directional motion.

11. The apparatus of claim 1, wherein the housing is included within a handheld interface device.

12. The apparatus of claim 1, wherein the housing is included within a mouse.

13. The apparatus of claim 12, wherein the haptic feedback is configured to be associated with a graphical representation displayed by a host computer.

14. The apparatus of claim 1, further comprising a microprocessor coupled to the sensor and to the actuator, the microprocessor configured to receive host commands from a host computer and sensor signals from the sensor, and to output force signals to the actuator associated with the haptic feedback.

15. An apparatus, comprising:
   a housing;
   a sensor coupled to the housing, the sensor configured to detect a user manipulation of at least a portion of the housing and output sensor signals associated with the user manipulation of the portion of the housing; and
   an actuator assembly coupled to the housing, the actuator assembly including an actuator, a first flex joint and a second flex joint each being coupled to the actuator, the actuator being configured to output an inertial force to the housing, wherein the inertial force is a rotary force, the first flex joint being coupled to a rotating shaft of the actuator, the second flex joint being coupled to a remaining portion of the actuator, the first flex joint and the second flex joint being configured to allow a movement of the actuator with respect to the housing.

16. The apparatus of claim 15, wherein the movement of the actuator is approximately linear with respect to the housing, the inertial force output by the actuator being approximately linear.

17. The apparatus of claim 15, wherein the first flex joint includes a rotating member coupled to the housing.

18. The apparatus of claim 17, wherein the second flex joint includes a collar coupled to the actuator.

19. An actuator assembly comprising:
   an actuator, the actuator being configured to output haptic feedback; and
   a flexure mechanism configured to couple the actuator to a housing, the flexure mechanism being configured to allow a movement of the actuator with respect to the housing, the flexure mechanism having a first portion and a second portion each being coupled to the actuator and including at least one flex joint, the first portion of the flexure mechanism being coupled to a rotating shaft of the actuator and the second portion of the flexure mechanism being coupled to the remaining portion of the actuator.

20. The actuator assembly of claim 19, wherein the first portion of the flexture mechanism includes a rotating member coupled to the housing by the at least one flex joints.

21. The actuator assembly of claim 19, wherein the first portion of the flexture mechanism includes a collar coupled to the actuator and a flex joint coupling the collar to the housing.

22. The actuator assembly of claim 19, wherein the actuator is configured to move with a bi-directional motion, a force output from the actuator being associated with the bi-directional motion to produce pulse and vibration haptic feedback.

23. An apparatus, comprising:
a housing;
a sensor coupled to the housing, the sensor configured to detect a manipulation of at least a portion of the housing and output sensor signals associated with the manipulation of the portion of the housing;
an actuator coupled to the housing, the actuator configured to output a force associated with the sensor signals; and
a first flex joint and a second flex joint each being coupled to the housing and the actuator, the first flex joint being coupled to a rotating shaft of the actuator and the second flex joint being coupled to a portion of the actuator excluding the rotating shaft, the first flex joint and the second flex joint configured to transfer the force output from the actuator to the housing to produce a haptic feedback.

24. The apparatus of claim 23, wherein the housing includes a substantially flat base configured to be in contact with a support surface, the movement of the actuator being substantially perpendicular to the substantially flat base of the housing.

25. The apparatus of claim 23, wherein the housing includes a contact member configured to be contacted by a user, the contact member being coupled to the actuator and configured to transmit an inertial force to the user.

26. The apparatus of claim 23, wherein the first flex joint includes a rotating member coupled to the housing.

27. The apparatus of claim 26, wherein the second flex joint includes a collar coupled to the actuator.

28. The apparatus of claim 23, wherein the rotating shaft of the actuator has a range of motion, the first flex joint including at least one stop disposed within the range of motion of rotating shaft.

29. The apparatus of claim 23, wherein the actuator is configured to move with a bi-directional action, the force output from the actuator being associated with the bi-directional motion.

30. The apparatus of claim 23, wherein the housing is included within a handheld interface device.

31. An apparatus, comprising:
a housing;
a sensor coupled to the housing, the sensor configured to detect a manipulation of at least a portion of the housing and output sensor signals associated with the manipulation of the portion of the housing; and
an actuator assembly disposed within the housing, the actuator assembly including an actuator, a first flex joint and a second flex joint each being coupled to the actuator, the actuator being configured to output an inertial force to the housing, the first flex joint and the second flex joint being configured to allow a movement of the actuator with respect to the housing.

32. The apparatus of claim 31, wherein the first flex joint is coupled to a rotating shaft of the actuator, and the second flex joint is coupled to a remaining portion of the actuator.

33. The apparatus of claim 31, wherein the movement of the actuator is approximately linear with respect to the housing, the inertial force output by the actuator being approximately linear.

34. The apparatus of claim 31, wherein the first flex joint includes a rotating member coupled to the housing.

35. The apparatus of claim 34, wherein the second flex joint includes a collar coupled to the actuator.

* * * * *